United States Patent [19]

Lee

[11] Patent Number: 4,697,349
[45] Date of Patent: Oct. 6, 1987

[54] MULTI-FUNCTION MEASURING APPARATUS

[76] Inventor: Rule Lee, No. 34, Lane 697, Tunhwa S. Rd., Taipei, Taiwan, R.O.C., Taiwan

[21] Appl. No.: 13,897

[22] Filed: Feb. 11, 1987

[51] Int. Cl.$^4$ .................... G01B 3/10; G01C 15/10
[52] U.S. Cl. .................... 33/27.03; 33/138; 33/342; 33/393; 33/414
[58] Field of Search .................... 33/27.01, 27.03, 138, 33/339, 342, 353, 393, 394, 414

[56] References Cited

U.S. PATENT DOCUMENTS

| | | | |
|---|---|---|---|
| 1,473,877 | 11/1923 | Rome | 33/353 |
| 2,673,398 | 3/1954 | Baumgart | 33/414 |
| 3,191,308 | 6/1965 | Lindenau | 33/414 |
| 3,526,964 | 9/1970 | Clark, Jr. | 33/27.03 |
| 3,568,322 | 3/1971 | Showers | 33/393 |
| 4,143,462 | 3/1979 | Gertz | 33/27.03 |
| 4,438,538 | 3/1984 | Larsen | 33/414 |

FOREIGN PATENT DOCUMENTS 2405461 6/1979 France .................... 33/394

Primary Examiner—Richard R. Stearns
Attorney, Agent, or Firm—Morton J. Rosenberg

[57] ABSTRACT

A housing substantially with a rectangular-box shape containing a flexible measuring tape stored therein and a tape-opening provided on the upper face thereof. An ink box containing ink and an ink thread is provided on the front face of the housing. The outermost end of the ink thread is attached to a needle grip with a needle. A level is provided on the upper face of the housing. A pivotal centering needle is provided on a position of one side face of the housing proximate to the tape-opening. The centering needle is used as a centering arm for a pair of compasses while the measuring tape is used as a cantilever arm for determining the radius of an arc or a circle. A pivotal plate set of the first side face of the housing and a hook member set of the opposite face, together with the ink thread pulled out, provide the function of a plumb rule for determining the vertically of a perpendicular plane.

4 Claims, 5 Drawing Figures

4,697,349

MULTI-FUNCTION MEASURING APPARATUS

BACKGROUND OF THE INVENTION

This invention relates to a multi-function measuring apparatus which can be used as a measuring tape, a level instrument, an ink box, a pair of compasses and a plumb rule for determining the verticality of a plane.

Conventional measuring tapes, level instruments, ink boxes (cups) used by carpenters for making marks, plumb rules for determining the verticality of a plane and compasses for drawing arcs or circles are necessary to general civil or architectural technicians and workers. Since both the structure and the function of above-mentioned instruments are distinct from each other, a compact measuring apparatus possessing the functions of all the above-mentioned instruments is hence desirable and beneficial.

SUMMARY OF THE INVENTION

A primary objective of the present invention is, therefore, to provide a multi-function measuring apparatus which comprises a measuring tape, a level instrument and an ink box in a single body.

Another objective of the present invention is to provide a multi-function measuring apparatus which further comprises some attachment such that it can also be used as a plumb rule and a pair of compasses.

A further objective of the present invention is to provide a multi-function measuring apparatus which is compact and easy to use.

Further objectives and advantages of the present invention will become apparent as the following description proceeds, and the features of novelty which characterize the invention be pointed out with particularity in the claims annexed to and forming a part of this invention.

DETAILED DESCRIPTION OF THE PREFERRED EMBODIMENT

Figure 1:
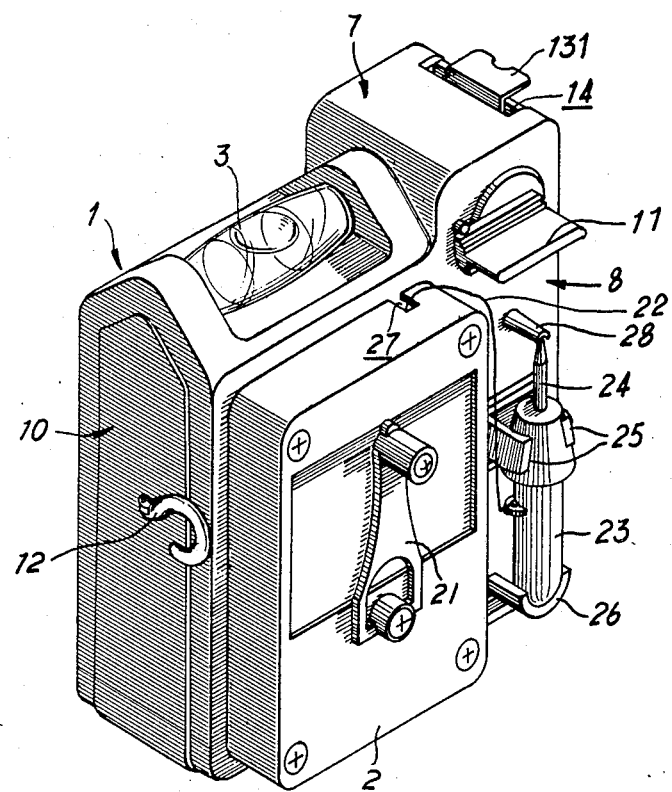
FIG. 1 is a perspective view of an embodiment of the multi-function measuring apparatus according to the present invention.
Figure 2:
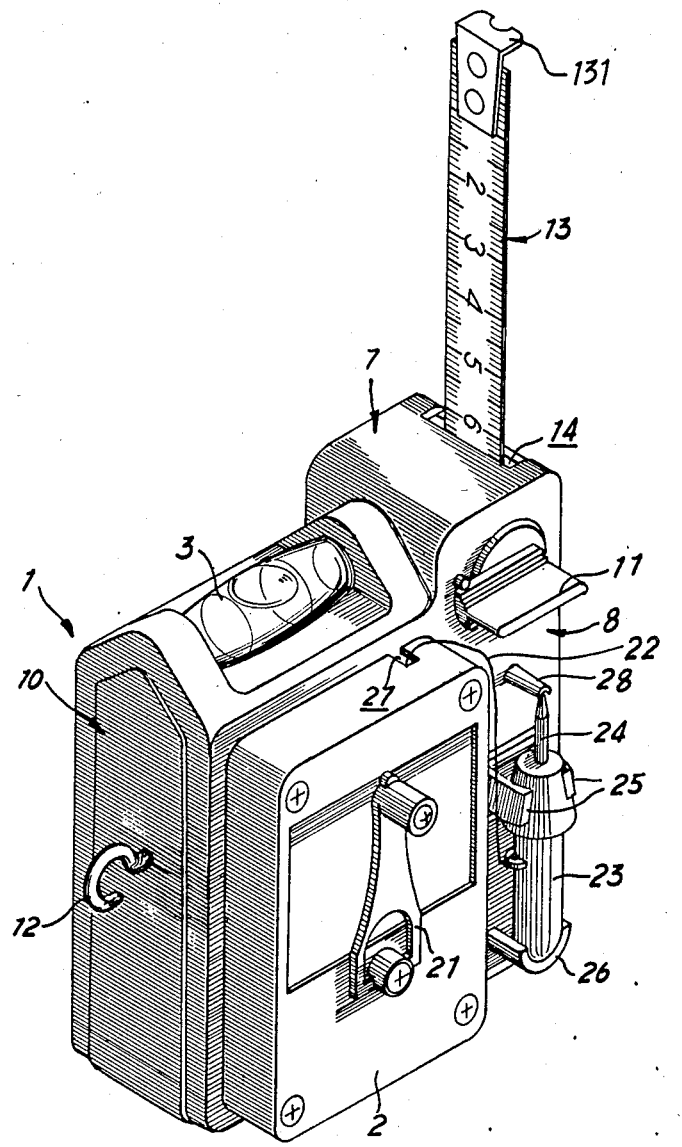
FIG. 2 illustrates that the measuring tape in the measuring apparatus is pulled out for measuring the distance.

Referring to the drawings, particularly to FIGS. 1 and 2, it can be seen that the multi-function measuring apparatus comprises a housing 1 substantially having the shape of a rectangular box. A flexible masuring tape 13 is wound and therefore stored in the inside of the housing 1. The measuring tape 13 has an L-shaped front portion 131 which is retained at an opening 14 provided on one end of the upper face 7 of the housing 1. The measuring tape 13 can then be vertically pulled out of the housing 1, as shown in FIG. 2, for measuring the distance. A locking member 11 for locking the measuring tape 13 is disposed on one lateral face (defined as the front face 8 of the housing 1 in this embodiment) at a position slightly below the opening 14 of the measuring tape 13. A level 3 for determining or adjusting a surface to a horizontal plane is disposed on the upper face 7 of the housing 1 and lengthwise beside the opening 14 of the measuring tape 13. An ink box 2 containing ink (not shown) and an ink thread 22 therein used by carpenters for making marks is disposed on the front face 8 of the housing 1 with a thread opening 27 provided on the upper surface of the ink box 2. The outermost end of the ink thread 22 is attached to a needle grip 23 which has a needle 24 on the outer end thereof. When not in use, the needle grip 23 with a needle 24 is to be fixed beside the ink box 2 by a pair of flexible retaining arms 25 and a supporting member 26. A protecting protrusion 28 preventing the point of the needle 24 from sticking the user is disposed above the pair of retaining arms 25. A pivotal handle 21 for winding in the ink thread 22 after it has been pulled out is disposed on the front surface of the ink box 2. The handle 21 locks the ink thread 22 and hence prevents it from being further pulled out when turned to the locked position as shown in FIG. 5.

Figure 4:
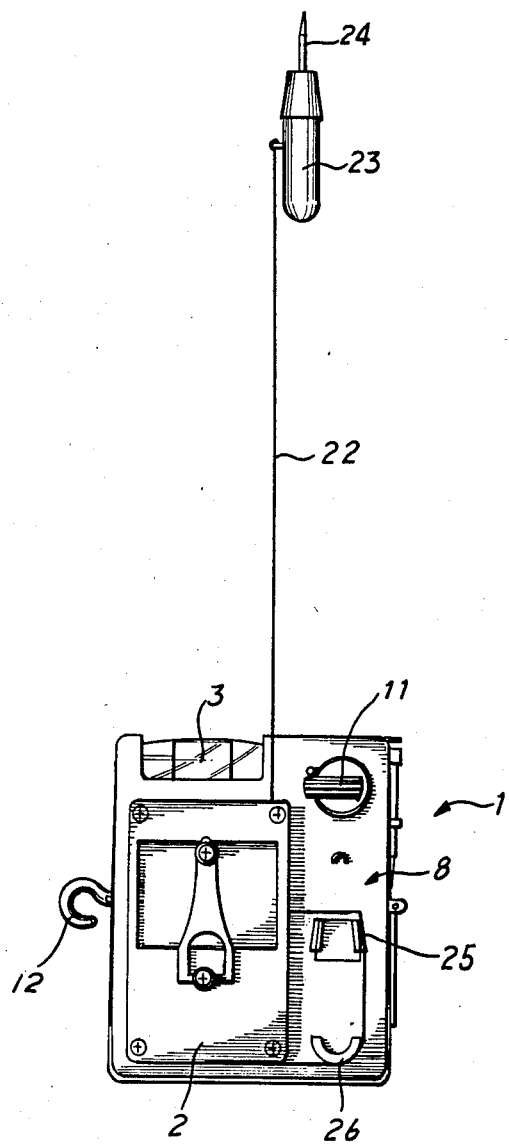
FIG. 4 is a side elevational view of the measuring apparatus, wherein the ink thread therein is pulled out for making marks.

Referring particularly to FIG. 4, the utilization of the ink box 2 together with the ink thread 22 can be clearly seen. The ink thread 22 will leave ink on the surface to be marked after the ink thread 22 is pulled straight and subsequently contacted with the surface.

Figure 3:
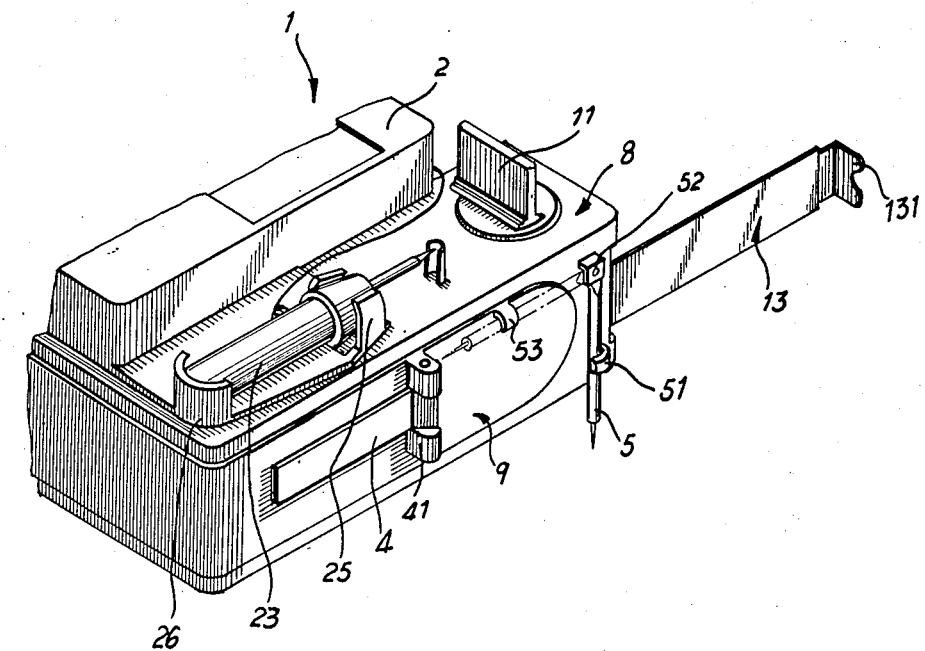
FIG. 3 is a partial perspective view of the measuring apparatus.

Referring now to FIGS. 1 and 3, it can be clearly seen that a centering needle 5 used as a centering arm of a pair of compasses is pivotally mounted to a fixing lug 52 set on an appropriate position of the first side face 9 of the housing 1 close to the opening 14 of the measuring tape 13. The fixing lug 52 of the pivotal centering needle 5 is proximate to the intersection of the front, upper and first side faces 7, 8 and 9, respectively. When the present multi-function measuring apparatus is used as a pair of compasses to determine an arc or a circle of a comparatively large radius, the pivotal centering needle 5 is first pivoted down (as shown in FIG. 3) to be secured to a retaining lug 51. Since the retaining lug 51 is positioned directly below the fixing lug 52 provided that the front face 8 of the housing 1 faces up, the point of the centering needle 5, having been engaged to the retaining lug 51, would face down and hence is usable as a centering arm of a pair of compasses. While, the measuring tape 13 is used as a centilever arm for determining the radius of an arc or a circle. Any suitable attachment on the L-shaped front portion 131 or the front portion itself is then used as a means for drawing an arc or a circle. The front portion of the measuring tape 13 can also be made of a comparatively hard material and be formed with an appropriate shape for effectively drawing lines on soft surfaces. When not in use, the centering needle 5 can be pivoted upward (as shown with imaginary lines in FIG. 3) so as to be engaged to a retaining lug 53 provided beside the fixing lug 52 with a lengthwise distance therebetween. A verticality-determination plate 4 is pivotally mounted between two retaining blocks 41 provided on the middle portion of the first side face 9 of the housing 1.

Figure 5:
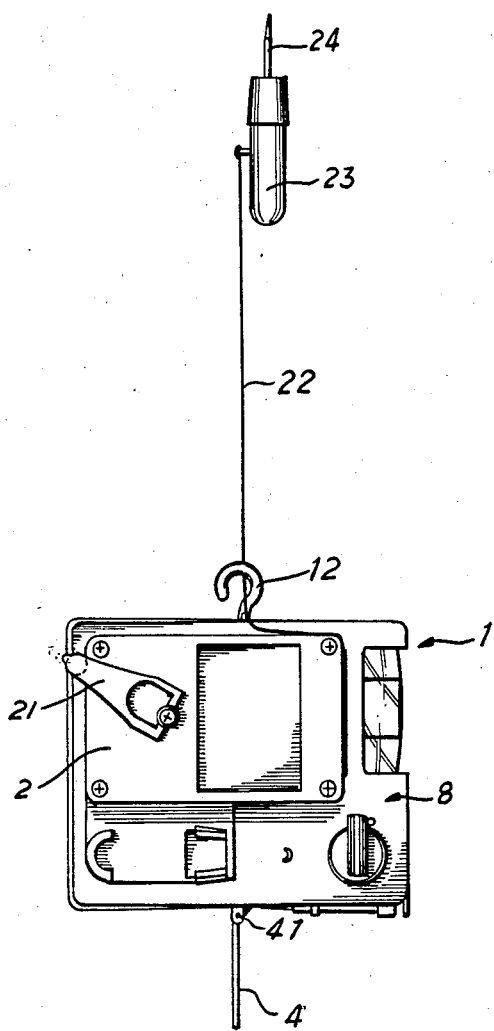
FIG. 5 is a side elevational view of the measuring apparatus illustrating its function of measuring the verticality of a perpendicular plane.

Referring to FIG. 5, it can be seen that the verticality-determination plate 4 can be pivoted 90 degrees outward so as to be perpendicular to the first side face 9 of the housing 1. Referring back to FIGS. 1 and 2, it can be seen that a hook means 12 for retaining the ink thread 22 is pivotally provided on the second side face 10 of the housing 1 opposite to the first side face 9 (see FIG. 3) thereof. The retaining hook means 12 and the verticality-determination plate 4 (which has been pivoted outward) are aligned along the same vertical axis in the case that the second side face 10 exactly faces up. When the ink thread 22 is pulled out and retained by the hook means 11, which has been pivoted outward and locked by turning the handle 21 to the locked position, and the needle 24 on the needle grip 23 is attached to a suitable article or the needle grip 23 is held by a user, the present multi-function measuring apparatus becomes a plumb rule. Therefore, the plate 4, having been pivoted 90 degrees outward to face down, can be used to determine the verticality of a plane.

As various possible embodiments might be made of the above invention, and as various adaptations might be made in the embodiment above set forth, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. A multi-function measuring apparatus comprising:
   (a) a housing substantially having the shape of a rectangular box, said housing comprising an upper face, a front face, a first side face and a second side face;
   (b) a measuring tape stored in said housing, said measuring tape having a front portion of appropriate shape so as to be retained on an opening provided on said upper face of said housing;
   (c) a level provided on said upper face of said housing;
   (d) an ink box, with a locking handle, provided on said front face of said housing, said ink box comprising ink and an ink thread stored therein, the outermost end of said ink thread being attached to a needle grip having a needle thereon;
   (e) a centering needle pivotally mounted to a fixing lug set on said first side face of said housing;
   (f) a verticality-determination plate pivotally mounted between two retaining blocks provided on said first side face of said housing; and
   (g) a hook means pivotally provided on said second side face of said housing opposite to said first side face thereof.

2. A multi-function measuring apparatus as set forth in claim 1, wherein said fixing lug is proximate to the intersection of said front, upper and first side faces of said housing.

3. A multi-function measuring apparatus as set forth in claim 2, wherein a retaining lug is provided directly below said fixing lug in the case that said front face of said housing faces up.

4. A multi-function measuring apparatus as set forth in claim 1, wherein said hook means and said verticality-determination plate which has been pivoted 90 degrees outward are aligned along the same vertical axis in the case that said second side face exactly faces up.

* * * * *